US012573636B2

(12) United States Patent
Kim et al.

(10) Patent No.: US 12,573,636 B2
(45) Date of Patent: Mar. 10, 2026

(54) BINDER SOLUTION FOR ALL-SOLID-STATE BATTERY, ELECTRODE SLURRY FOR ALL-SOLID-STATE BATTERY COMPRISING THE SAME AND METHOD OF MANUFACTURING ALL-SOLID-STATE BATTERY USING THE SAME

(71) Applicants: HYUNDAI MOTOR COMPANY, Seoul (KR); Kia Corporation, Seoul (KR); Seoul National University R&DB Foundation, Seoul (KR)

(72) Inventors: Sang Mo Kim, Hwaseong-si (KR); Sang Heon Lee, Yongin-si (KR); Yong Sub Yoon, Seoul (KR); Jae Min Lim, Suwon-si (KR); Ju Yeong Seong, Hwaseong-si (KR); Jin Soo Kim, Suwon-si (KR); Jang Wook Choi, Seoul (KR); Kyu Lin Lee, Seoul (KR); Ji Eun Lee, Seongnam-si (KR)

(73) Assignees: Hyundai Motor Company, Seoul (KR); Kia Corporation, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 81 days.

(21) Appl. No.: 18/409,458

(22) Filed: Jan. 10, 2024

(65) Prior Publication Data

US 2024/0145719 A1 May 2, 2024

Related U.S. Application Data

(62) Division of application No. 16/704,259, filed on Dec. 5, 2019, now abandoned.

(30) Foreign Application Priority Data

May 10, 2019 (KR) ........................ 10-2019-0054853

(51) Int. Cl.
*H01M 4/62* (2006.01)
*C08L 25/18* (2006.01)
(Continued)

(52) U.S. Cl.
CPC ............. *H01M 4/622* (2013.01); *C08L 25/18* (2013.01); *C08L 33/08* (2013.01); *C08L 39/04* (2013.01);
(Continued)

(58) Field of Classification Search
None
See application file for complete search history.

(56) References Cited

U.S. PATENT DOCUMENTS

| | | | |
|---|---|---|---|
| 2016/0248095 A1 | 8/2016 | Kurata | |
| 2018/0351194 A1 | 12/2018 | Lee | |
| 2020/0083525 A1 | 3/2020 | Lee | |

FOREIGN PATENT DOCUMENTS

| | | |
|---|---|---|
| CN | 108431992 A | 8/2018 |
| JP | 2012-243476 A | 12/2012 |

(Continued)

OTHER PUBLICATIONS

Machine translation of JP 2018106844 A.*
Ahn et al ("Synthesis and polymerization of t-BOC protected maleimide monomers: N-(t-butyloxycarbonyloxy)maleimide and N-[p-t-butyloxycarbonyloxy)phenyl]-maleimide", Polymer, vol. 36, No. 13, 1995, p. 2621-2628).*

(Continued)

*Primary Examiner* — Jonathan G Leong
*Assistant Examiner* — Tony S Chuo
(74) *Attorney, Agent, or Firm* — Morgan Lewis & Bockius LLP

(57) ABSTRACT

A binder solution for an all-solid-state battery, an electrode slurry for an all-solid-state battery including the same and a method of manufacturing an all-solid-state battery using the same, and more particularly to a binder solution for an all-solid-state battery, in which a polymer binder configured such that a non-polar functional group is bonded to the end (Continued)

of a polar functional group is used, whereby the polar functional group is provided by a deprotection mechanism of the polymer binder through a thermal treatment, thus increasing adhesion between electrode materials to thereby improve battery capacity and enabling a wet process to thereby reduce manufacturing costs, an electrode slurry for an all-solid-state battery including the same and a method of manufacturing an all-solid-state battery using the same.

1 Claim, 5 Drawing Sheets

(51) Int. Cl.

| | |
|---|---|
| ***C08L 33/08*** | (2006.01) |
| ***C08L 39/04*** | (2006.01) |
| ***H01M 4/04*** | (2006.01) |

(52) U.S. Cl.

CPC .. *H01M 4/0402* (2013.01); *H01M 2300/0068* (2013.01)

(56) References Cited

FOREIGN PATENT DOCUMENTS

| | | | |
|---|---|---|---|
| JP | 2018-106844 | A | 7/2018 |
| KR | 10-2016-0118979 | A | 10/2016 |
| KR | 10-2016-0149042 | A | 12/2016 |
| KR | 10-2017-0032207 | A | 3/2017 |
| KR | 10-2018-0054511 | A | 5/2018 |

OTHER PUBLICATIONS

Final Office Action dated Oct. 18, 2023 issued in U.S. Appl. No. 16/704,259.

J. Lee, et al., "In Situ Deprotection of Polymeric Binders for Solution-Processible Sulfide-Based All-Solid-State Batteries," Advanced Materials, vol. 32, 2020.

Non-Final Office Action dated Apr. 3, 2023 issued in U.S. Appl. No. 16/704,259.

Final Office Action dated Sep. 7, 2022 issued in U.S. Appl. No. 16/704,259.

Non-Final Office Action dated Apr. 26, 2022 issued in U.S. Appl. No. 16/704,259.

* cited by examiner

BINDER SOLUTION FOR ALL-SOLID-STATE BATTERY, ELECTRODE SLURRY FOR ALL-SOLID-STATE BATTERY COMPRISING THE SAME AND METHOD OF MANUFACTURING ALL-SOLID-STATE BATTERY USING THE SAME

CROSS REFERENCE TO RELATED APPLICATION

The present application is a divisional patent application of U.S. patent application Ser. No. 16/704,259, filed on Dec. 5, 2019, which claims priority based on Korean Patent Application No. 10-2019-0054853, filed May 10, 2019, the entire content of which are incorporated herein for all purposes by this reference.

BACKGROUND OF THE DISCLOSURE

The present disclosure relates to a binder solution for an all-solid-state battery, which includes a polymer binder having superior chemical stability in the presence of a solid electrolyte and high binding force, whereby a polar carboxylic acid functional group of the binder is expressed through pyrolysis, thus inducing chemical bonding between the binder and the electrode material to thereby enhance adhesion and ultimately improve battery capacity, an electrode slurry for an all-solid-state battery including the same, and a method of manufacturing an all-solid-state battery using the same.

Recently, accidents involving the combustion and explosion of lithium secondary batteries have been frequently reported due to the use of a liquid electrolyte, and thus interest in the safety of the batteries is increasing rapidly.

Hence, an all-solid-state battery using a solid-state electrolyte in lieu of a liquid electrolyte is receiving attention. An all-solid-state battery is applicable as a next-generation energy source because it is safe and is also advantageous in terms of battery performance such as high energy density, high power density and long life.

However, the all-solid-state battery is based on a dry process, which complicates the manufacturing process and decreases price competitiveness, and thus limitations are imposed on the marketability thereof. With the goal of solving these problems, in order to manufacture an all-solid-state battery using a liquid-electrolyte-based wet process, it is essential to introduce a binder for increasing the binding force between electrode materials. In particular, a binder for an all-solid-state battery has to be chemically and electrochemically stable in the presence of a solid electrolyte having high reactivity and should exhibit good binding force even upon the addition of a small amount thereof.

Meanwhile, the solid electrolyte for an all-solid-state battery is mainly exemplified by a sulfide-based solid electrolyte having high ionic conductivity. The sulfide-based solid electrolyte is capable of forming an electrode mainly using a wet process. Here, there is a need for a binder to manufacture an electrode using a wet process. Since the sulfide-based solid electrolyte has high chemical reactivity with a polar compound, a non-polar binder has been mainly used to suppress reactivity and increase dispersibility. However, when a non-polar binder without a polar functional group, which imparts adhesion of the binder, is used, adhesion to the electrode or solid electrolyte layer is poor compared to when using a polar binder.

Therefore, it is necessary to research and develop a new binder, which may satisfy the requirements of both chemically stability in the presence of a solid electrolyte and good adhesion.

(Patent Document 1) Korean Patent Application Publication No. 10-2017-0032207

SUMMARY OF THE DISCLOSURE

Accordingly, the present disclosure has been made to solve the problems encountered in the related art, and an objective of the present disclosure is to provide a binder solution for an all-solid-state battery, which is chemically stable in the presence of a solid electrolyte and exhibits good adhesion.

Another objective of the present disclosure is to provide an electrode slurry for an all-solid-state battery, which enables a wet process and exhibits good adhesion even at minimum binder content.

Still another objective of the present disclosure is to provide a method of manufacturing an all-solid-state battery, which may ensure superior battery performance and may reduce manufacturing costs.

The objectives of the present disclosure are not limited to the foregoing, and will be able to be clearly understood through the following description and to be realized by the means described in the claims and combinations thereof.

The present disclosure provides a binder solution for an all-solid-state battery, comprising: a polymer binder comprising a compound containing an ester group of Chemical Formula 1 below; and a solvent:

$$R_1\text{—COO—}R_2 \qquad \text{[Chemical Formula 1]}$$

wherein in Chemical Formula 1:

- $R_1$ is an alkyl group, a -OA group or a heterocyclic group, wherein A is selected from the group consisting of an alkyl group, a heteroalkyl group, a cyclic group, a heterocyclic group, an aryl group, a heteroaryl group and combinations thereof; and
- $R_2$ is —$C(CH_3)_3$ or —$CH(CH_3)OR_3$, wherein $R_3$ is selected from the group consisting of an ethyl group, an i-propyl group, a butyl group, a tert-butyl group and combinations thereof.

The alkyl group of R 1 may include a repeating unit of

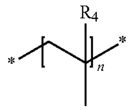

wherein:

- n is an integer of 100 to 5000 and * represents a bonding site; and
- $R_4$ is selected from the group consisting of hydrogen, an alkyl group, a halogen group and combinations thereof.

The polymer binder may be at least one selected from the group consisting of compounds represented by Chemical Formula 2 below to Chemical Formula 6 below (wherein n is an integer of 100 to 5000 and * represents a bonding site).

[Chemical Formula 2]

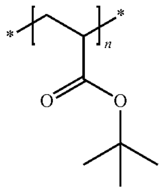

[Chemical Formula 3]

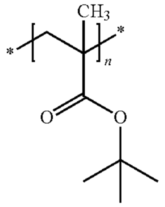

[Chemical Formula 4]

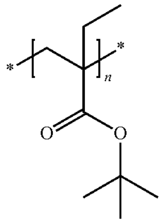

[Chemical Formula 5]

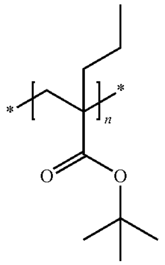

[Chemical Formula 6]

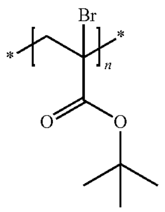

The polymer binder may be at least one selected from the group consisting of compounds represented by Chemical Formula 7 below to Chemical Formula 10 below (wherein n is an integer of 100 to 5000 and * represents a bonding site).

[Chemical Formula 7]

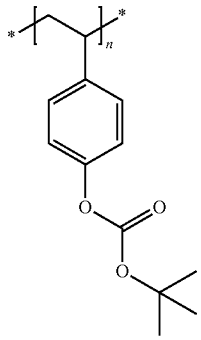

[Chemical Formula 8]

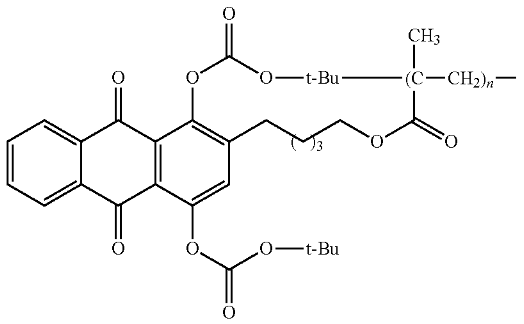

[Chemical Formula 9]

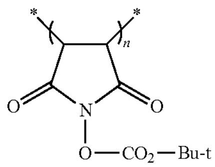

[Chemical Formula 10]

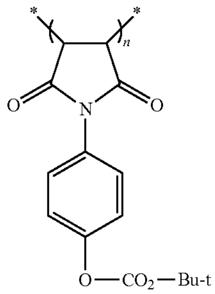

The polymer binder may be a compound represented by Chemical Formula 11 below:

[Chemical Formula 11]

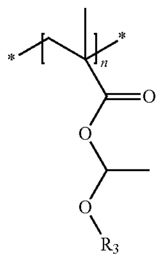

(in Chemical Formula 11, n is an integer of 100 to 5000, * represents a bonding site, and $R_3$ is selected from the group consisting of an ethyl group, an i-propyl group, a butyl group, a tert-butyl group and combinations thereof).

The polymer binder may be a compound represented by Chemical Formula 12 below.

[Chemical Formula 12]

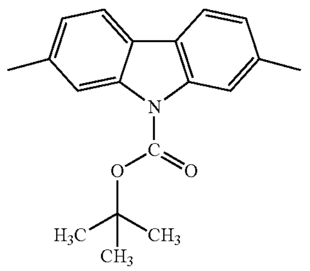

The solvent may be selected from the group consisting of butyrate, toluene, xylene, anisole, hexane, heptane, dibromomethane, dichloroethane, ethanol, glycol ether and combinations thereof.

The binder solution may comprise 2.5 to 45 wt % of the polymer binder and 55 to 97.5 wt % of the solvent.

In addition, the present disclosure provides an electrode slurry for an all-solid-state battery, comprising: the binder solution, an electrode active material, a conductive material, and a solid electrolyte.

The electrode slurry may comprise 0.1 to 10 wt % of the binder solution, 75 to 93 wt % of the electrode active material, 1 to 10 wt % of the conductive material and 5 to 25 wt % of the solid electrolyte.

The solid electrolyte may be a sulfide-based solid electrolyte.

In addition, the present disclosure provides a method of manufacturing an all-solid-state battery, comprising: preparing a binder solution including a polymer binder and a solvent; preparing an electrode slurry by mixing the binder solution, an electrode active material, a conductive material and a solid electrolyte; and forming an electrode by applying the electrode slurry on a substrate and performing thermal treatment at a temperature of 100 to 250° C. for 1 min to 12 hr.

The electrode slurry may comprise 0.1 to 10 wt % of the binder solution, 75 to 93 wt % of the electrode active material, 1 to 10 wt % of the conductive material and 5 to 25 wt % of the solid electrolyte.

In the forming the electrode, the polymer binder in the electrode may be modified into a polymer binder containing a carboxyl group through the thermal treatment.

The amount of the carboxyl group of the polymer binder modified in the forming the electrode may be 1 to 40 wt % based on the total amount of the polymer binder.

The solid electrolyte may be a sulfide-based solid electrolyte.

According to the present disclosure, a binder solution for an all-solid-state battery is chemically stable in the presence of a solid electrolyte in the electrode slurry state, and is capable of enhancing adhesion between electrode materials when incorporated in the solid-state electrode.

Also, according to the present disclosure, an electrode for an all-solid-state battery includes a binder solution having superior stability and good adhesion, thus exhibiting good adhesion between electrode materials even at minimum binder content in the electrode, ultimately improving battery performance.

Also, according to the present disclosure, an all-solid-state battery enables a wet process using an electrode slurry in lieu of an existing dry process, thus reducing manufacturing costs and ensuring battery performance such as high energy density and high power output.

Also, in the all-solid-state battery according to the present disclosure, the protecting group of the polymer binder is removed through pyrolysis during thermal treatment to thus express a polar carboxylic acid functional group, thereby inducing hydrogen bonding between the binder and the electrode material and polar-polar interactions, ultimately resulting in good adhesion.

The effects of the present disclosure are not limited to the foregoing, and should be understood to include all reasonably possible effects in the following description.

DESCRIPTION OF SPECIFIC EMBODIMENTS

Figure 1:
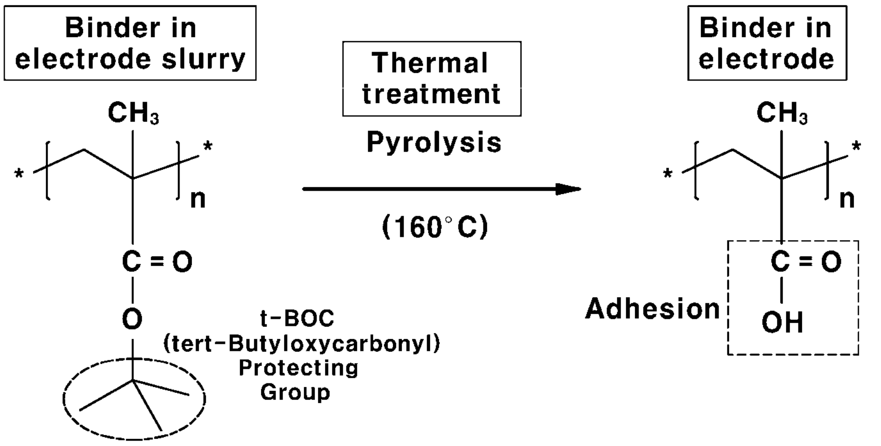
FIG. 1 shows a mechanism of removing a non-polar functional group through pyrolysis of the polymer binder represented by Chemical Formula 3 according to the present disclosure.

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second"

element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

A detailed description of the present disclosure follows.

The present disclosure pertains to a binder solution for an all-solid-state battery, an electrode slurry for an all-solid-state battery including the same, and a method of manufacturing an all-solid-state battery using the same.

As described above, a conventional all-solid-state battery is mainly manufactured through a complicated manufacturing process based on a dry process and is thus problematic because of the low price competitiveness thereof. Also, in order to introduce an inexpensive wet process, it is important to select a binder that is chemically stable in the presence of a sulfide-based solid electrolyte having high reactivity and that further exhibits high binding force.

According to the present disclosure, the binder solution for an all-solid-state battery includes a polymer binder that facilitates the protection and deprotection of a polymer functional group through simple thermal treatment, thereby ensuring chemical stability in the presence of a solid electrolyte in the electrode slurry state and increasing adhesion between electrode materials when incorporated in the solid-state electrode.

In addition, the electrode for an all-solid-state battery according to the present invention includes a binder solution having superior stability and good adhesion, thus increasing adhesion between electrode materials even at minimum binder content in the electrode, thereby improving battery performance.

In addition, the all-solid-state battery according to the present invention may be manufactured through a wet process using an electrode slurry, in lieu of a conventional dry process, thereby reducing manufacturing costs and ensuring battery performance such as high energy density and high power output.

Moreover, in the all-solid-state battery according to the present invention, a polar carboxylic acid functional group may be expressed by removing the protecting group of the polymer binder through pyrolysis during a thermal treatment, thereby inducing hydrogen bonding between the binder and the electrode material and polar-polar interactions, ultimately resulting in good adhesion.

More specifically, the binder solution for an all-solid-state battery according to the present disclosure includes a polymer binder comprising a compound containing an ester group of Chemical Formula 1 below and a solvent:

$R_1$—COO-$R_2$ [Chemical Formula 1]

wherein in Chemical Formula 1:

$R_1$ is an alkyl group, a -OA group or a heterocyclic group, A is selected from the group consisting of an alkyl group, a heteroalkyl group, a cyclic group, a heterocyclic group, an aryl group, a heteroaryl group and combinations thereof, and $R_2$ is —$C(CH_3)_3$ or —$CH(CH_3)OR_3$, wherein $R_3$ is selected from the group consisting of an ethyl group, an i-propyl group, a butyl group, a tert-butyl group and combinations thereof.

Here, the alkyl group of $R_1$ may include a repeating unit of

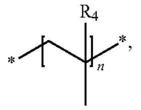

wherein:

n is an integer from 100 to 5000, inclusive, and * represents a bonding site, and $R_4$ being selected from the group consisting of hydrogen, an alkyl group, a halogen group and combinations thereof.

The polymer binder may include a non-polar functional group —$C(CH_3)_3$ or —$CH(CH_3)OR_3$ in the binder solution. The polymer binder, which is configured such that a non-polar functional group is bonded to the end of a carboxylic acid group serving as a polar functional group, is capable of providing a polar carboxylic acid functional group upon protection and deprotection through pyrolysis.

The non-polar functional group of the polymer binder is non-polar in a binder solution phase, thus minimizing chemical reactivity between electrode materials in the electrode slurry and increasing dispersibility. The electrode material may include an electrode active material, a conductive material or a solid electrolyte. In particular, the solid electrolyte may be a sulfide-based solid electrolyte. The sulfide-based solid electrolyte may include the polymer binder, which is non-polar and chemically stable in the electrode slurry state, thus improving stability. Also, in the process of manufacturing the all-solid-state battery, the polymer binder may be modified through a thermal treatment to thereby increase binding force between electrode materials.

The carboxylic acid group of the polymer binder is able to induce hydrogen bonding between the electrode active material, the solid electrolyte and the conductive material and polar-polar interactions to thus exhibit good adhesion when incorporated in the solid-state electrode.

The polymer binder may be a compound containing an ester group of Chemical Formula 1 below:

$R_1$—COO-$R_2$ [Chemical Formula 1]

wherein in Chemical Formula 1:

$R_1$ is an alkyl group, a -OA group or a heterocyclic group, wherein A is selected from the group consisting of an alkyl group, a heteroalkyl group, a cyclic group, a heterocyclic group, an aryl group, a heteroaryl group and combinations thereof, and $R_2$ is —$C(CH_3)_3$ or —$CH(CH_3)OR_3$, wherein $R_3$ is selected from the group consisting of an ethyl group, an i-propyl group, a butyl group, a tert-butyl group and combinations thereof, and.

Here, the alkyl group of $R_1$ may include a repeating unit of

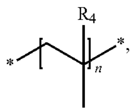

wherein:

n is an integer from 100 to 5000, inclusive and * represents a bonding site), and $R_4$ being selected from the group consisting of hydrogen, an alkyl group, a halogen group and combinations thereof.

The alkyl group of $R_4$ may be a $C_1$ to $C_{20}$ alkyl group, and is preferably a $C_1$ to $C_{10}$ alkyl group, and more preferably a $C_1$ to $C_6$ alkyl group.

Specifically, the polymer binder may be at least one selected from the group consisting of compounds represented by Chemical Formula 2 below to Chemical Formula 6 below (wherein n is an integer from 100 to 5000, inclusive, and * represents a bonding site).

[Chemical Formula 2]

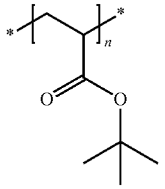

[Chemical Formula 3]

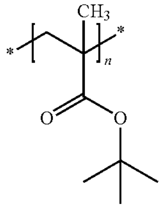

[Chemical Formula 4]

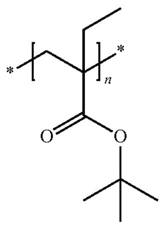

-continued

[Chemical Formula 5]

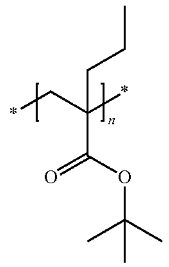

[Chemical Formula 6]

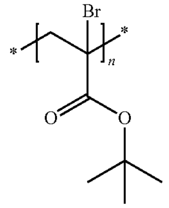

FIG. 1 shows a mechanism of removing a non-polar functional group through pyrolysis of the polymer binder represented by Chemical Formula 3 according to the present disclosure. With reference thereto, upon the formation of the electrode slurry, —$C(CH_3)_3$, which is a non-polar functional group of Chemical Formula 3, is bonded to the end of the ether group, and is thus chemically stable in the presence of the solid electrolyte. Then, thermal treatment is performed to manufacture an electrode, whereby —$C(CH_3)_3$ is removed through pyrolysis, thus forming a carboxyl group —COOH, which is a polar functional group, when incorporated in the solid-state electrode. When incorporated in the electrode, the polar functional group of the binder does not chemically react with the solid electrolyte and is thus stable.

In the polymer binder, $R_1$ may be a -OA group. Here, A may be selected from the group consisting of an alkyl group, a heteroalkyl group, a cyclic group, a heterocyclic group, an aryl group, a heteroaryl group and combinations thereof. Specifically, the polymer binder may be at least one selected from the group consisting of compounds represented by Chemical Formula 7 below to Chemical Formula 10 below (wherein n is an integer from 100 to 5000, inclusive, and * represents a bonding site).

[Chemical Formula 7]

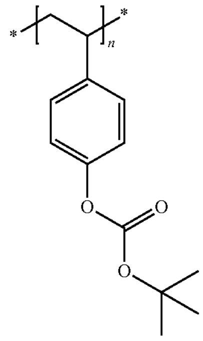

-continued

[Chemical Formula 8]

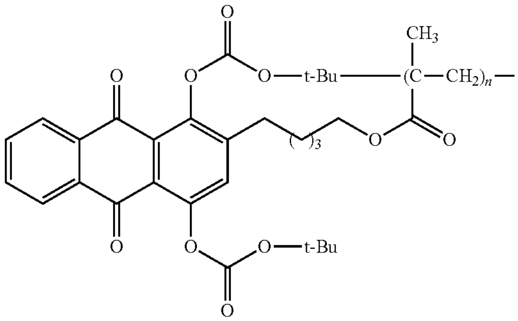

[Chemical Formula 9]

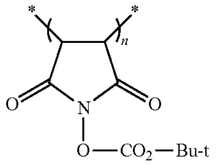

[Chemical Formula 10]

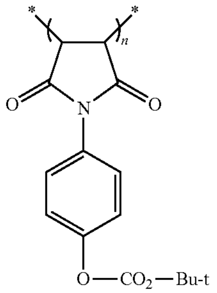

In the -OA group, the alkyl group of A may have a repeating unit of

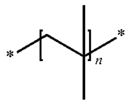

(wherein n is an integer from 100 to 5000, inclusive, and * represents a bonding site). Specifically, the polymer binder may be a compound represented by Chemical Formula 11 below:

[Chemical Formula 11]

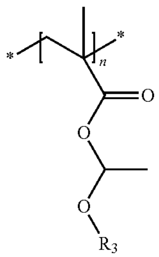

(in Chemical Formula 11, n is an integer from 100 to 5000, inclusive, * represents a bonding site, and $R_3$ is selected from the group consisting of an ethyl group, an i-propyl group, a butyl group, a tert-butyl group and combinations thereof).

Figure 2:
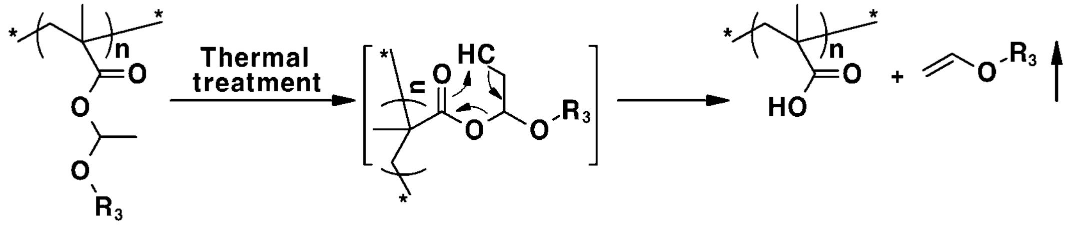
FIG. 2 shows a mechanism of removing a non-polar functional group through pyrolysis of the polymer binder represented by Chemical Formula 11 according to the present disclosure.

FIG. 2 shows a mechanism of removing a non-polar functional group through pyrolysis of the polymer binder represented by Chemical Formula 11 according to the present disclosure. With reference to FIG. 2, when in the electrode slurry state, $—COR_3$, which is a non-polar functional group, is bonded to the end of the polymer binder, and is thus chemically stable in the presence of the solid electrolyte. Then, when thermal treatment is performed to manufacture an electrode, $—COR_3$, which is a non-polar functional group, is removed due to hydrogen migration through pyrolysis, thus forming a carboxyl group —COOH, which is a polar functional group, when incorporated in the solid-state electrode.

Here, $R_1$ may be a heterocyclic group. Specifically, the polymer binder may be a compound represented by Chemical Formula 12 below.

[Chemical Formula 12]

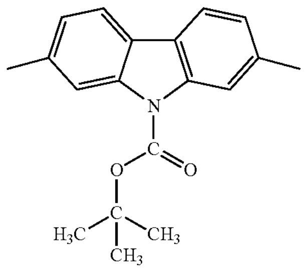

As the solvent, any solvent may be used so long as it is able to dissolve and disperse the compound containing an ester group of Chemical Formula 1. Specifically, the solvent may be selected from the group consisting of butyrate, toluene, xylene, anisole, hexane, heptane, dibromomethane, dichloroethane, ethanol, glycol ether and combinations thereof, but is not limited thereto.

The binder solution may include 2.5 to 45 wt % of the polymer binder and 55 to 97.5 wt % of the solvent. As such, if the amount of the polymer binder is less than 2.5 wt %, it may be difficult to adjust the viscosity of the slurry. On the other hand, if the amount of the polymer binder exceeds 45 wt %, uniform dispersion of the binder may become difficult.

In addition, the present disclosure pertains to an electrode slurry for an all-solid-state battery comprising the binder solution, an electrode active material, a conductive material and a solid electrolyte.

The electrode slurry may comprise 0.1 to 10 wt % of the binder solution, 75 to 93 wt % of the electrode active material, 1 to 10 wt % of the conductive material and 5 to 25 wt % of the solid electrolyte. In particular, if the amount of the binder solution is less than 0.1 wt %, the binding force between the electrode active material, the conductive material and the solid electrolyte may decrease. On the other hand, if the amount of the binder solution exceeds 10 wt %, electrode resistance may increase due to the binder, thus deteriorating electrochemical performance and making it difficult to further increase binding force.

The solid electrolyte may be a sulfide-based solid electrolyte.

In addition, the present disclosure pertains to a method of manufacturing an all-solid-state battery, the method comprising preparing a binder solution including a polymer binder and a solvent; preparing an electrode slurry by mixing the binder solution, an electrode active material, a conductive material and a solid electrolyte; and forming an electrode by applying the electrode slurry on a substrate and performing thermal treatment at a temperature of 100 to 250° C. for 1 min to 12 hr.

In the forming the electrode, the thermal treatment temperature may fall in the range of 100 to 250° C. As such, if the thermal treatment temperature is lower than 100° C., expression of the polar carboxyl group of the polymer binder may become difficult. On the other hand, if the thermal treatment temperature is higher than 250° C., side reactions in or between the active material, the conductive material and the solid electrolyte in the slurry may occur, thus causing changes in material composition. Preferably, the thermal treatment temperature ranges from 150 to 180° C., and more preferably 150 to 160° C.

The electrode slurry may comprise 0.1 to 10 wt % of the binder solution, 75 to 93 wt % of the electrode active material, 1 to 10 wt % of the conductive material and 5 to 25 wt % of the solid electrolyte.

Through a thermal treatment in the forming the electrode, the polymer binder in the electrode may be modified into a polymer binder containing a carboxyl group. Here, the amount of the carboxyl group, which is deprotected through the thermal treatment, may be 1 to 40 wt % based on the total amount of the polymer binder. As such, if the amount of the carboxyl group is less than 1 wt %, the binding force of the binder may not be exhibited. On the other hand, if the amount of the carboxyl group exceeds 40 wt %, it may be difficult to uniformly form the electrode.

The solid electrolyte may be a sulfide-based solid electrolyte.

A better understanding of the present disclosure will be given through the following examples, which are merely set forth to illustrate but are not to be construed as limiting the present disclosure.

Example 1

90 wt % of a butyrate solvent was mixed with 10 wt % of poly(tert-butyl acrylate) having a number average molecular weight of 143,000 g/mol, thus preparing a binder solution. Then, 2 wt % of the binder solution, 81 wt % of an electrode active material, 2 wt % of a conductive material and 15 wt % of a solid electrolyte were mixed, thus preparing a cathode slurry. As the electrode active material, a cathode active material, that is, the lithium transition metal oxide $LiNi_{0.6}Co_{0.2}Mn_{0.2}O_2$ was used, the conductive material was carbon black, and as the solid electrolyte, a $Li_2S—P_2S_5$-LiCl-based sulfide solid electrolyte, that is, argyrodite $Li_6PS_5Cl$ was used.

The cathode slurry was cast on an aluminum current collector and then subjected to a thermal treatment at 160° C. for 12 hr. As such, the deprotection of the tert-butyl protecting group of the polymer binder caused by the thermal treatment removed the protecting group, thereby manufacturing a cathode including a polymer binder of a carboxylic-acid-functional-group-expressed poly(tert-butyl acrylate)-co-polyacrylic acid (TBA/AA).

Thereafter, a solid electrolyte membrane, an anode, and an anode current collector were sequentially stacked on the cathode through typical processing, thereby manufacturing an all-solid-state battery. Here, the solid electrolyte membrane was a $Li_2S$-$P_2S_5$-LiCl-based sulfide solid electrolyte, that is, argyrodite $Li_6PS_5Cl$, and the anode was lithium-indium metal. Also, the anode current collector was a copper foil.

Example 2

An all-solid-state battery was manufactured in the same manner as in Example 1, with the exception that poly(tert-butyl methacrylate) having a weight average molecular weight of 170,000 g/mol was used as the polymer binder.

Comparative Example 1

An all-solid-state battery was manufactured in the same manner as in Example 1, with the exception that an electrode was manufactured through a typical dry process by mixing a $Li_2S$-$P_2S_5$-LiCl-based sulfide solid electrolyte with a butadiene binder.

Comparative Example 2

An all-solid-state battery was manufactured in the same manner as in Example 1, with the exception that an electrode was manufactured through a typical dry process by mixing a $Li_2S—P_2S_5$-LiCl-based sulfide solid electrolyte with a tert-butyl methacrylate (TBMA) binder.

Test Example 1

In order to evaluate the peaks of the solid electrolyte before and after thermal treatment of the electrode slurries of Examples 1 and 2and the $Li_2S—P_2S_5$-LiCl-based sulfide solid electrolyte membrane, an X-ray diffraction analysis (XRD)and a RAMAN spectrum were measured. The results are shown in FIGS. 3 and 4.

Figure 3:
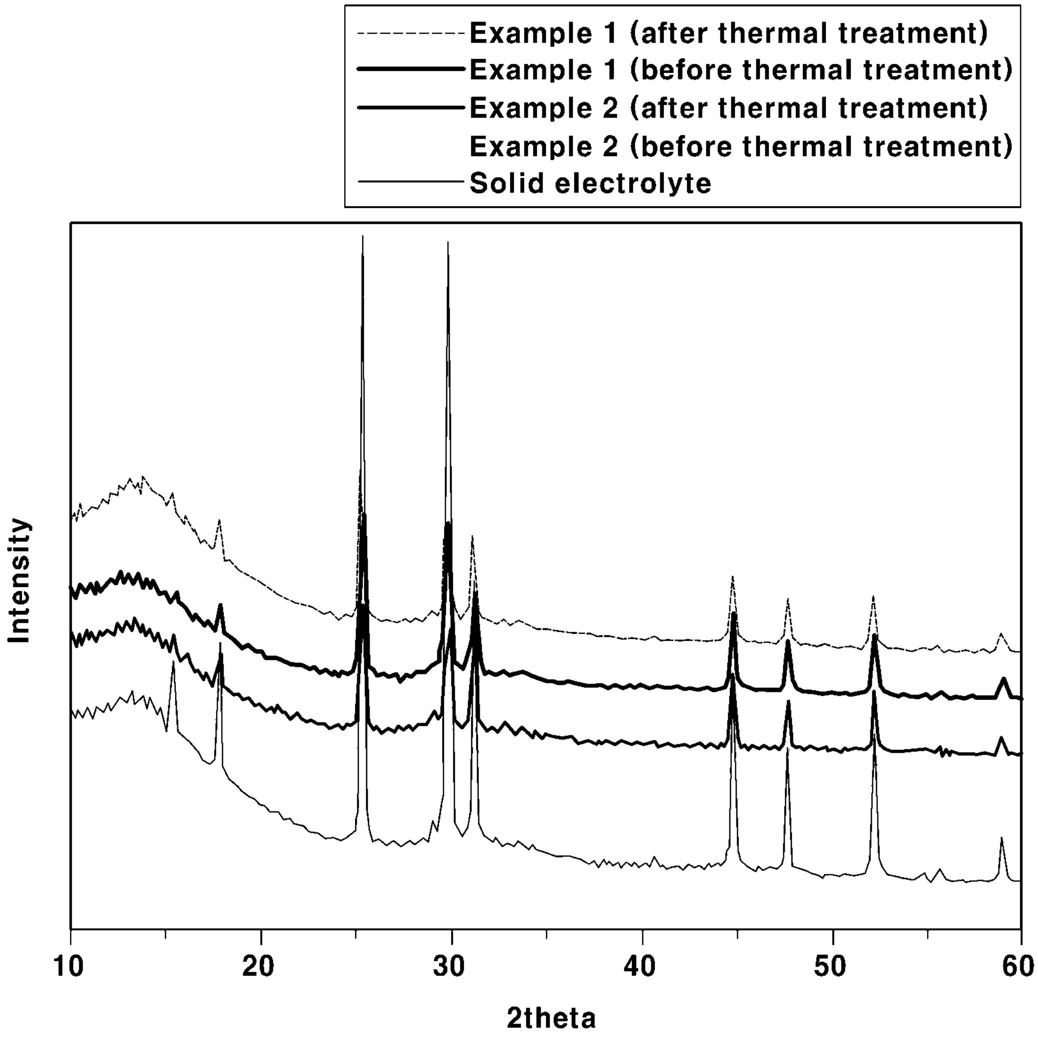
FIG. 3 is a graph showing the results of an X-ray diffraction analysis (XRD) before and after thermal treatment of the electrode slurries of Examples 1 and 2 according to the present disclosure and a $Li_2S—P_2S_5$-LiCl-based sulfide solid electrolyte membrane.

FIG. 3 is a graph showing the XRD results before and after thermal treatment of the electrode slurries of Examples 1 and 2 and the $Li_2S$-$P_2S_5$-LiCl-based sulfide solid electrolyte membrane. FIG. 4 is a graph showing the RAMAN results before and after thermal treatment of the electrode slurries of Examples 1 and 2 and the $Li_2S$-$P_2S_5$-LiCl-based sulfide solid electrolyte membrane.

Figure 4:
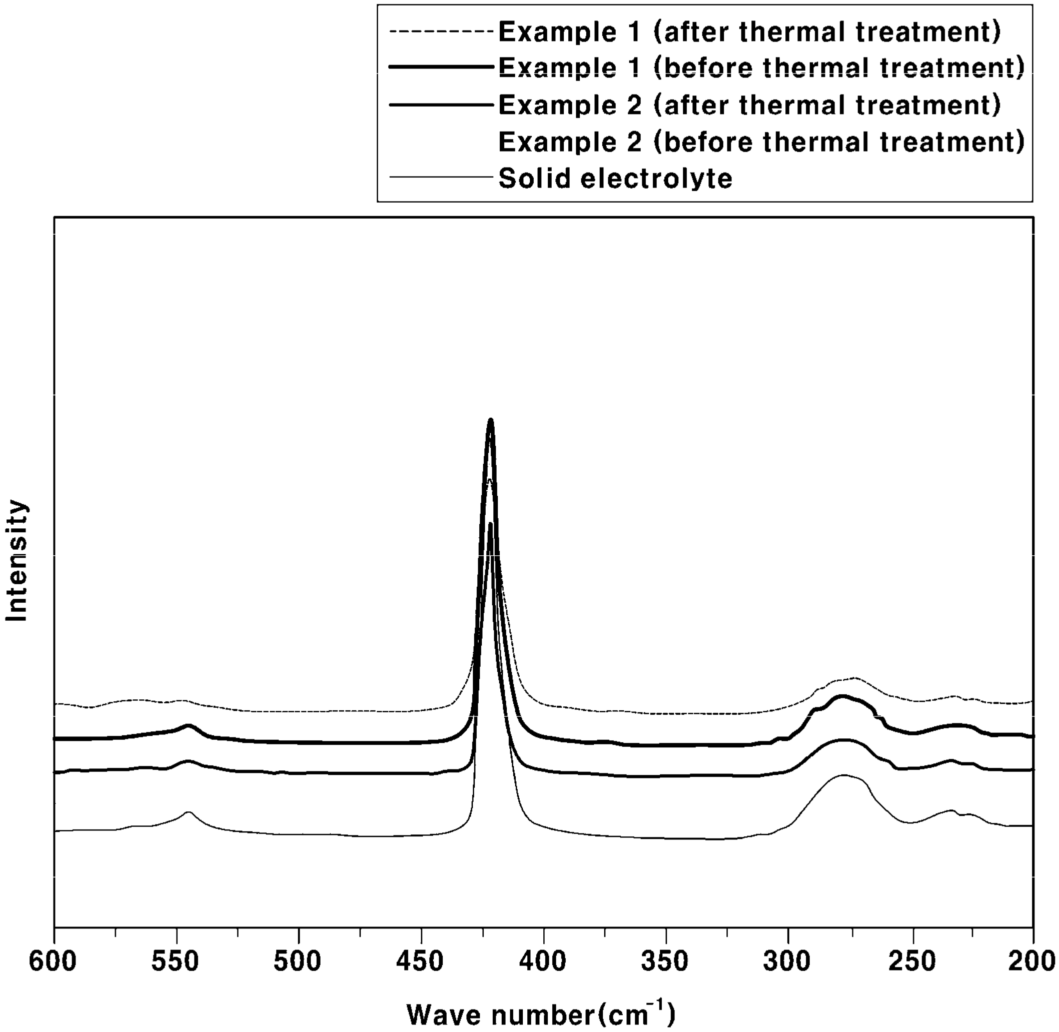
FIG. 4 is a graph showing the results of a RAMAN spectroscopy before and after thermal treatment of the electrode slurries of Examples 1 and 2 according to the present disclosure and a $Li_2S—P_2S_5$-LiCl-based sulfide solid electrolyte membrane.

With reference to FIGS. 3 and 4, the inherent peak of the solid electrolyte alone in a specific wavelength range was confirmed. The electrode slurry of each of Examples 1 and 2 before and after thermal treatment matched the inherent peak of the solid electrolyte, indicating that the solid electrolyte remained stable without undergoing any chemical reaction even after the deprotection reaction of the polymer binder due to the thermal treatment.

Test Example 2

The ionic conductivity of the all-solid-state battery manufactured using the electrode slurry of each of Examples 1 and 2 and Comparative Example 1 was measured. The results are shown in Table 1 below.

TABLE 1

| No. | Example 1 | Example 2 | Comparative Example 1 |
|---|---|---|---|
| Binder in electrode | TBMA/MAA | TBA/AA | BR |
| Ionic conductivity ($S \cdot cm^{-1}$) | $2.1 \times 10^{-3}$ | $1.6 \times 10^{-3}$ | $1.2 \times 10^{-3}$ |

As is apparent from the results of Table 1, in Examples 1 and 2, in which the electrode was manufactured through the thermal treatment using a wet process, ionic conductivity similar to that of Comparative Example 1 using a dry process was maintained. Thereby, in the electrodes of Examples 1 and 2, it was confirmed that the ionic conductivity remained stable because there was no chemical reactivity with the sulfide solid electrolyte in the deprotection mechanism of the binder through thermal treatment.

Test Example 3

The peel strength of the polymer binder in the all-solid-state battery manufactured in each of Examples 1 and 2 and Comparative Examples 1 and 2 and the charge-discharge characteristics thereof were measured. The results are shown in FIGS. 5 and 6.

The peel strength test was performed in accordance with a 180° peel testing method using a universal testing machine. Also, the charge-discharge test was performed through a constant-current constant-voltage (CCCV) process.

Figure 5:
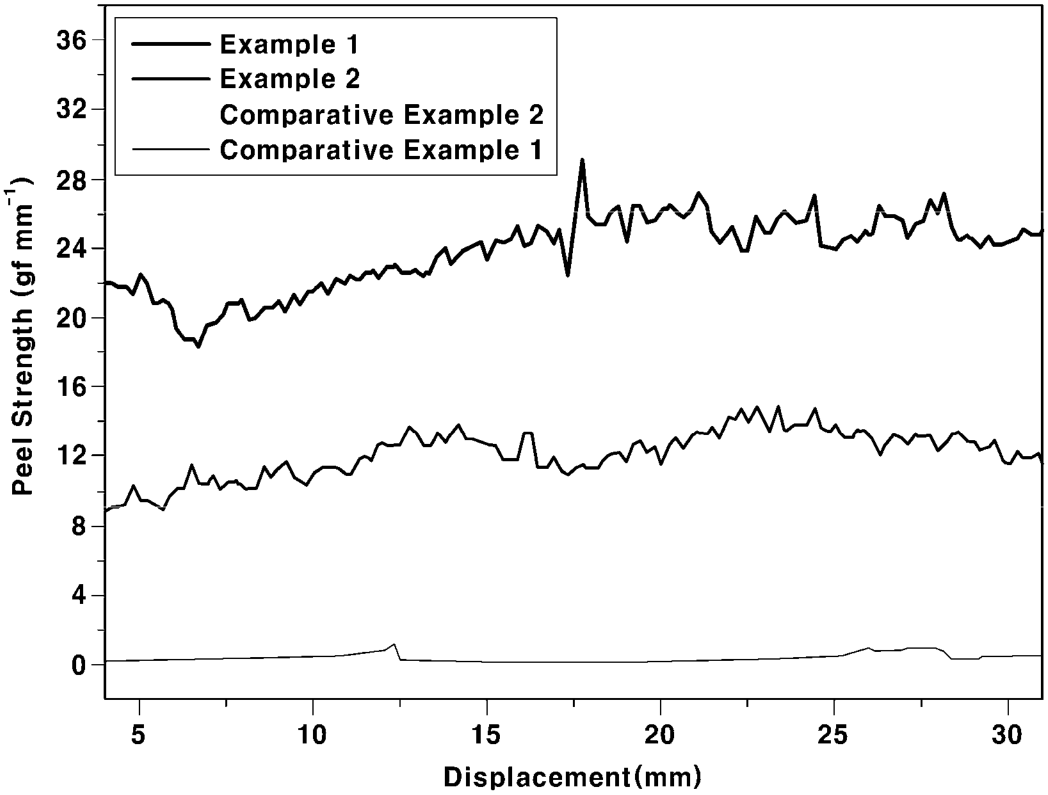
FIG. 5 is a graph showing the results of 180° peel strength depending on the displacement of the all-solid-state batteries of Examples 1 and 2 according to the present disclosure and Comparative Examples 1 and 2.
Figure 6:
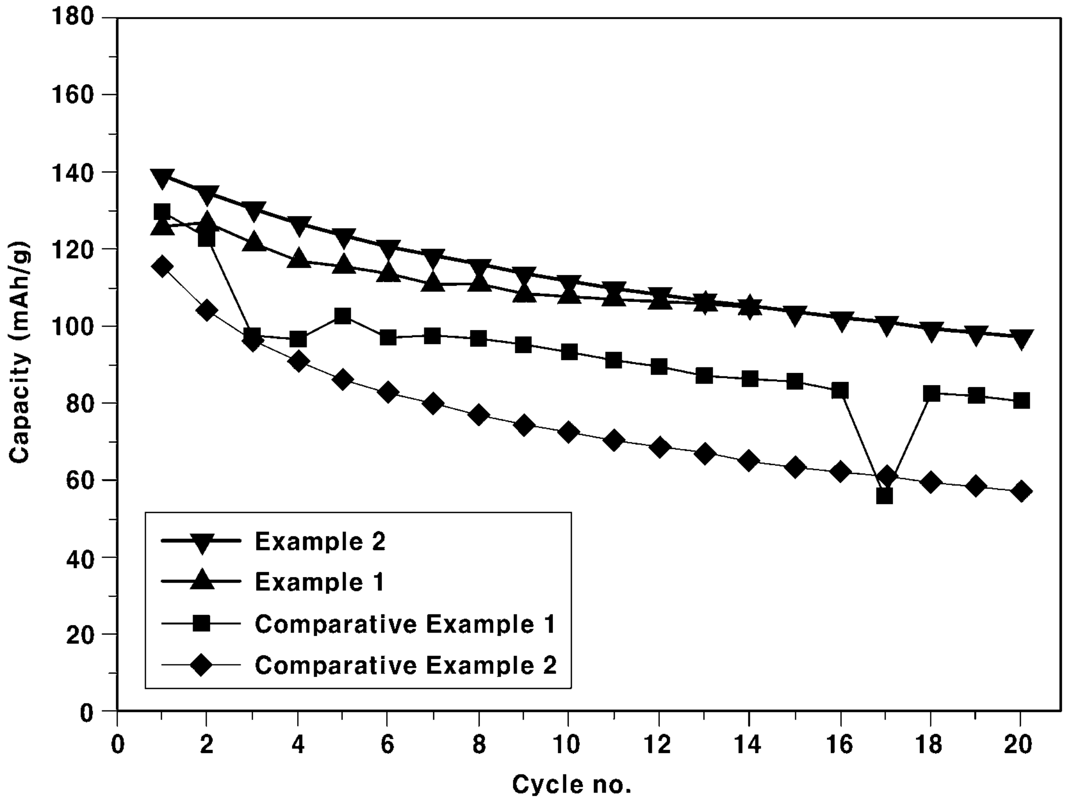
FIG. 6 is a graph showing the results of discharge capacity depending on the number of cycles of the all-solid-state batteries of Examples 1 and 2 according to the present disclosure and Comparative Examples 1 and 2.

FIG. 5 is a graph showing the results of 180° peel strength depending on the displacement of the all-solid-state battery of each of Examples 1 and 2 and Comparative Examples 1 and 2. With reference to FIG. 5, in Comparative Example 1 using the butadiene rubber binder having a low polarity, an adhesion between the electrode materials was the lowest. In Comparative Example 2 using the TBMA binder, since a thermal treatment was not performed, the non-polar functional group bonded to the end thereof was not removed but was left behind, and thus adhesion was measured to be lower than that in Example 2.

On the other hand, in Examples 1 and 2, it was confirmed that the non-polar functional group bonded to the end of the polymer binder was removed by the thermal treatment and that the polar functional group was present to thus increase adhesion between the electrode materials.

FIG. 6 is a graph showing discharge capacity depending on the number of cycles of the all-solid-state battery of each of Examples 1 and 2 and Comparative Examples 1 and 2. With reference to FIG. 6, in Examples 1 and 2, the binding between the electrode materials in the electrode before and after charge and discharge was maintained at an excellent level due to the enhancement of adhesion, and thus the discharge capacity was increased compared to Comparative Examples 1 and 2. In particular, in Comparative Example 2, the contact between the electrolyte and the active material was significantly deteriorated due to insufficient binding to the binder during the process of volume expansion and reduction of the electrode material before and after charge and discharge, and thus the lowest discharge capacity was observed.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. A binder solution for an all-solid-state battery, comprising:

a polymer binder comprising at least one selected from the group consisting of compounds represented by Chemical Formula 8 below; and a solvent:

[Chemical Formula 8]

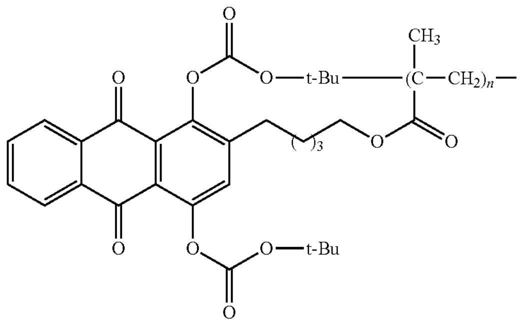

wherein n is an integer from 100 to 5000, inclusive, and * represents a bonding site.

* * * * *